(12) United States Patent
Rehrig

(10) Patent No.: US 7,481,662 B1
(45) Date of Patent: Jan. 27, 2009

(54) POWER CABLE ASSEMBLY CONNECTOR

(76) Inventor: Richard B. Rehrig, 500 S. Andreasen Dr., Escondido, CA (US) 92029

(*) Notice: Subject to any disclaimer, the term of this patent is extended or adjusted under 35 U.S.C. 154(b) by 0 days.

(21) Appl. No.: 12/122,650

(22) Filed: May 16, 2008

(51) Int. Cl.
*H01R 4/60* (2006.01)
(52) U.S. Cl. .................................................. 439/198
(58) Field of Classification Search ............... 439/680, 439/190, 191, 198, 207, 271, 275, 278–279, 439/283, 587
See application file for complete search history.

(56) References Cited

U.S. PATENT DOCUMENTS

| | | | | |
|---|---|---|---|---|
| 4,260,213 A | * | 4/1981 | Kotski et al. | 439/185 |
| 5,797,761 A | * | 8/1998 | Ring | 439/320 |
| 6,102,724 A | * | 8/2000 | Ring | 439/320 |

* cited by examiner

*Primary Examiner*—Edwin A. Leon
(74) *Attorney, Agent, or Firm*—Holland & Knight LLP; Richard A. Lyon, Jr.

(57) ABSTRACT

A connector assembly for releasably securing a welding torch to an extended end portion of a power cable assembly having an outer hose disposed about an electrically conductive cable for directing gas therethrough to the torch. An aperture is provided in the side wall of an electrically conductive tubular member between upstream and downstream portions thereof. An upstream portion of the tubular member is crimped about an end of the cable so as to define a generally U-shaped trough extending along the upstream portion of the tubular member, creating a gas flow path extending therealong to and through the aperture, into and through the downstream portion of the tubular member. A hose attachment sleeve is rotatably and sealably mounted on a pair of axially spaced sealing members on the downstream portion of the tubular member so that the torch can be rotated with respect to the hose during use, reducing strain on the welder.

28 Claims, 3 Drawing Sheets

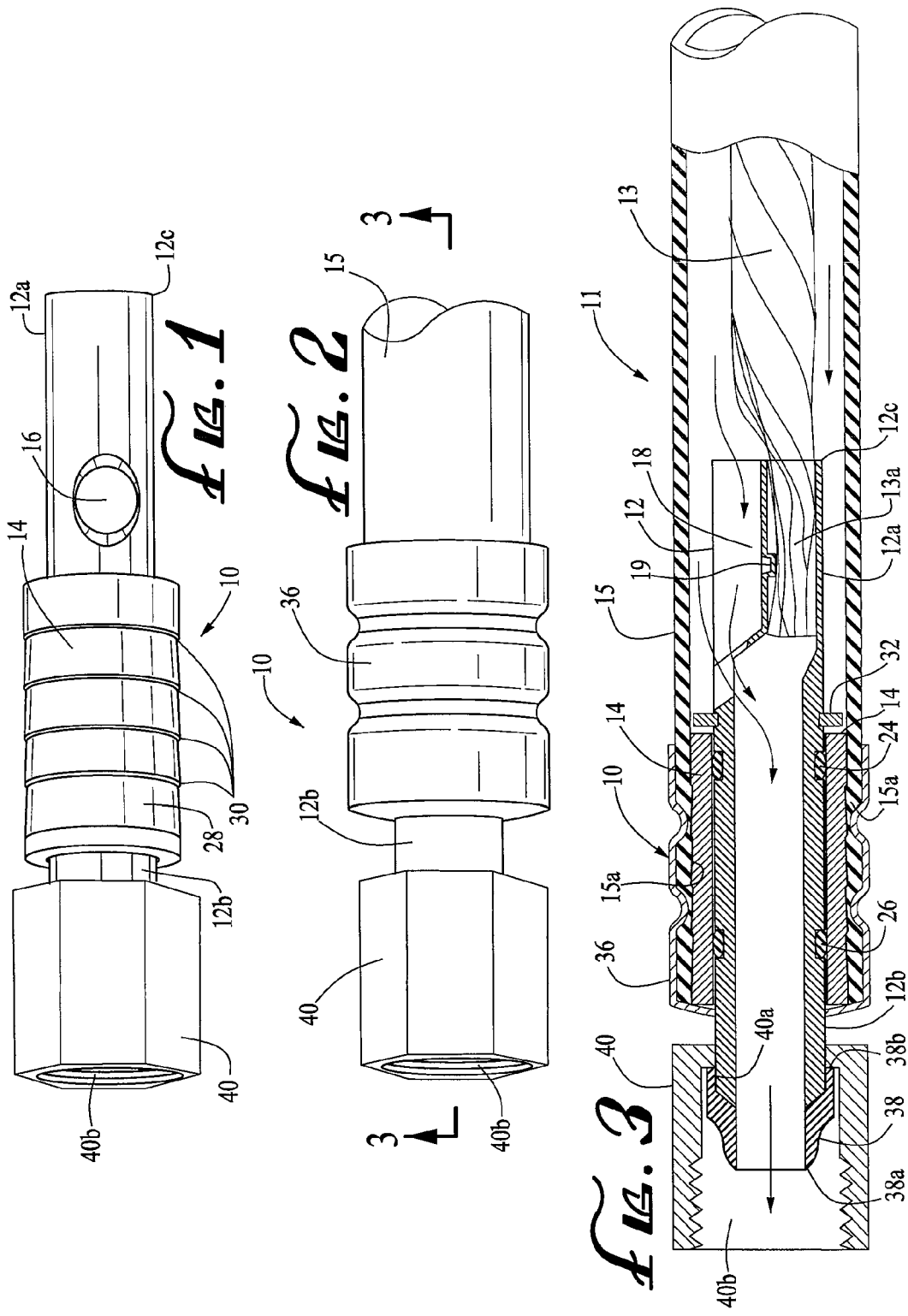

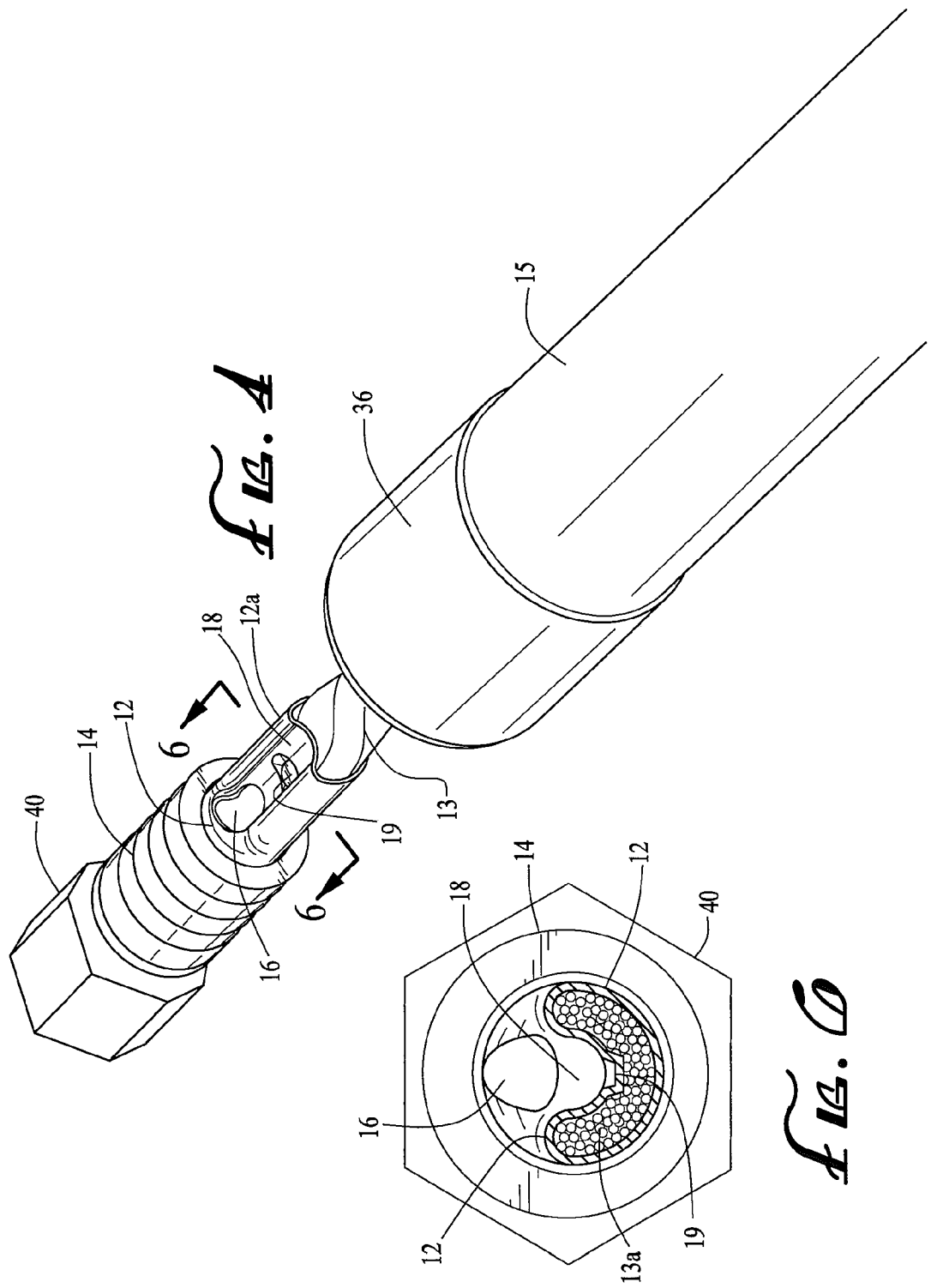

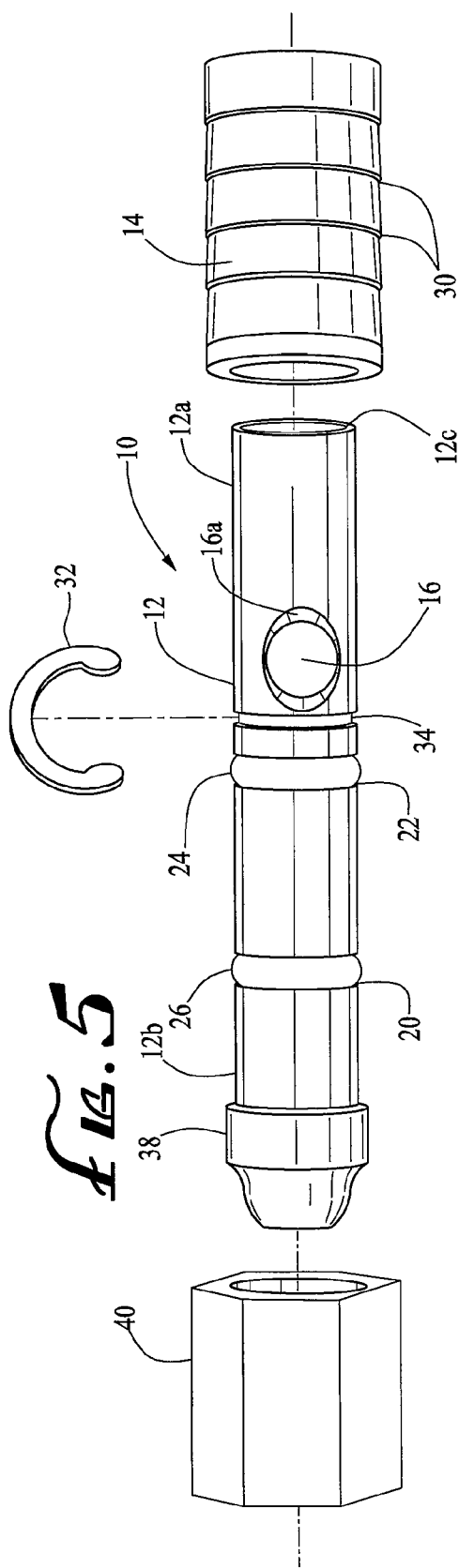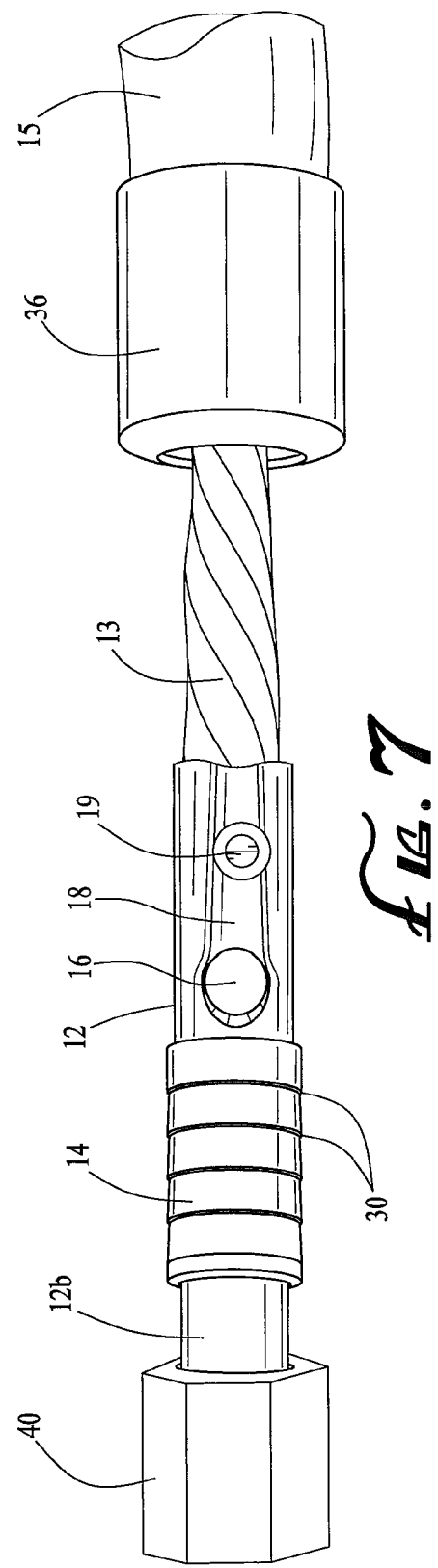

POWER CABLE ASSEMBLY CONNECTOR

BACKGROUND OF THE INVENTION

The present invention relates to power cable assembly connectors and more particularly, to a connector for releasably securing a power cable assembly to a TIG welding torch that enables a power cable assembly hose to twist or turn with respect to the torch during use to reduce the strain on the welder.

Welding torches used in TIG welding (tungsten inert gas), also known as GTAW (gas tungsten arc welding) are two general types, air or gas cooled and water cooled. Air or gas cooled welding torches are generally employed in lighter duty applications and are cooled by dissipating to the surrounding air the heat buildup in the torch during the weld cycle. Air cooled torches are commonly used for welding on job sites as they do not require cooling lines and water circulating equipment associates with the higher capacity water cooled torches. The power cable assembly used on such air cooled torches typically comprises an outer flexible plastic or rubber tube or hose, which houses a conductive cable comprised of fine strands of copper wire to conduct the electrical output from the welding machine to the TIG torch body. The outer hose also acts as a passageway for the weld shielding gas, usually argon, which protects the weld zone during the welding procedure. The power cable terminates at each end with a metal connector, one of which is threadably connected to the TIG torch body. The machine end of the power cable is similarly connected to the welding machine. The connection of the power cable to the torch body is firm and does not allow for relative movement therebetween. As a result, torsional resistance is encountered when the user manipulates the torch body during welding procedures.

A common procedure used in welding pipe is called "walking the cup" in which the welder moves the welding torch from side to side which in turn moves the torch nozzle (cup) and tungsten electrode from side to side along the weld joint. The procedure is tedious, precise and requires complete control of the torch movement by the welder. Overcoming the resistance to such movement created by the outer hose of the power cable assembly during the procedure can be very tiring to the welder. The present invention allows the outer hose to rotate as the torch handle is twisted and turned during use while maintaining the physical and electrical coupling between the torch and power cable assembly. Thus, the above-described torsional resistance of the hose is substantially eliminated, providing improved control of the TIG torch and reducing fatigue to the welder's hand.

SUMMARY OF THE INVENTION

Briefly, the present invention comprises a coupling particularly adapted for connecting an air cooled TIG welding torch to the power cable assembly so as to provide both a gas-tight connection between the torch body and the outer hose of the assembly and a positive electrical connection between the torch body and the power cable in the assembly while allowing the outer hose of the power cable assembly to undergo rotational movement with respect to the torch as the torch handle is twisted and turned during a welding procedure. In a preferred embodiment, the connector assembly of the present invention comprises an electrically conductive tubular member adapted to be affixed to the extended end of the power cable in a welding torch power cable assembly and define both an electrical connection and a gas passageway between the power cable assembly and the torch body. A hose attachment sleeve is mounted on and extends about at least a portion of the electrically conductive tubular member so as to form a gas-tight seal therewith while allowing relative rotational movement of the sleeve and tubular member. A threaded connector is carried by the downstream end of the tubular member for rigid securement to the torch body while providing shielding gas flow therethrough to the torch head. The hose attachment sleeve is configured to be secured to the downstream end of the outer power cable assembly hose whereby the hose can undergo rotational movement with the sleeve about and with respect to the power cable and the tubular member affixed to the cable such that torsional resistance of the outer hose to rotation of the welding torch during a welding procedure is substantially eliminated.

BRIEF DESCRIPTION OF THE DRAWINGS

FIG. 1 is a perspective view of a preferred embodiment of the power cable assembly connector of the present invention.

FIG. 2 is a perspective view of the connector of the present invention secured to a TIG welding torch power cable assembly.

FIG. 3 is a sectional view taken along line 3-3 in FIG. 2.

FIG. 4 is a perspective view showing the securement of the power cable to the electrically conductive tubular member in the connector of the present invention.

FIG. 5 is an exploded side view showing the elements of a preferred embodiment of the connector of the present invention.

FIG. 6 is a sectional view taken along the line 6-6 in FIG. 4.

FIG. 7 is another perspective view showing the securement of the power cable to the electrically conductive tubular member in the connector of the present invention.

DETAILED DESCRIPTION OF A PREFERRED EMBODIMENT

Referring now in detail to the drawings, a preferred embodiment of the connector assembly 10 of the present invention is shown that is particularly configured to releasably secure a power cable assembly 11 to a TIG welding torch (not shown). The connector assembly 10 comprises a tubular member 12 formed of an electrically conductive material, preferably copper, for electrically coupling the welding torch with the power cable 13 within the power cable assembly 11 and providing a flow passage for the shielding gas from the power cable assembly to the torch. The connector assembly 10 also includes a hose attachment sleeve 14, preferably constructed of a rigid, heat resistant material, such as brass, for securing the connector assembly 10 to the extended end portion 15a of the outer hose 15 in the power cable assembly. The tubular member 12 is preferably of single-piece construction and defines a first upstream portion 12a and a second downstream portion 12b. The first portion 12a has an aperture 16 in the side wall thereof proximate the second portion 12b as seen in FIG. 1. The tubular member is affixed to the power cable 13 of the power cable assembly 11 by inserting the extended end portion 13a of the power cable into the first portion 12a of the tubular member 12 through the open upstream end 12c thereof until the end of the cable is proximate the upstream edge 16a of aperture 16. The tubular member is then crimped along the first portion thereof upstream of aperture 16, as shown in FIGS. 4 and 6, affixing tubular member 12 to the power cable 13 and creating an elongated generally U-shaped trough 18 in the deformed sidewall of the tubular member 12. Trough 18 extends between aperture 16 and the upstream end 12c of the tubular member and allows for the passage of shielding gas from the power cable assembly 11 to and through aperture 16 to the torch head (not shown), as will be later described. A subsequent secondary crimping strip can be employed to provide a more localized crimp 19 in the trough 18 to strengthen the physical attachment of the tubular member 12 to the power cable 13.

The downstream portion 12b of tubular member 12 has a pair of spaced annular recesses 20 and 22 formed therein for carrying a pair of annular seals 24 and 26, preferably o-rings. The hose attachment sleeve 14 is disposed about the second portion 12b of the tubular member in sealing engagement with the o-ring seals 24 and 26. The seals 24 and 26 are sized relative to sleeve 14 for a static application so as to prevent gas loss therebetween. Such seals, however, will still allow for relative rotational movement between the sleeve 14 and tubular member 12. The outer surface 28 of the hose attachment sleeve 14 preferably is configured with barbs 30 and sized so as to be insertable in a relatively tight press fitment within the extended end portion 15a of the power cable assembly hose 15, as shown in FIG. 3. A retaining clip 32 is preferably utilized in cooperation with a shallow groove 34 in the tubular member to hold the upstream end of sleeve 14 on the tubular member 12. A second retaining clip and groove, or a suitable equivalent (not shown) also could be employed, if desired, proximate o-ring 26, to prevent forward movement of the hose attachment sleeve. A ferrule 36 made of a deformable material having little or no elastic memory, such as aluminum, is disposed about the extended end portion 15a of hose 15 and crimped in place, forcing the barbs 30 on sleeve 14 into the hose and securing the downstream end portion of the hose in place on the sleeve. Other means for securing the sleeve within the end of hose 15 such as tightening bands and wires could also be employed.

To secure the downstream end of the connector assembly 10 to the torch, an electrically conductive end fitting 38 is provided on the downstream end of the tubular member 12. Fitting 38 preferably is shaped so as to define a rounded outer end portion 38a and a rear shoulder 38b. Shoulder 38b is adapted to abut and sealably engage an interior planar mating surface 40a disposed about the rear portion of the threaded bore 40b in a freely rotatable coupling nut 40 (see FIG. 3) upon the nut having been slided over the tubular member 12 and fitting 38 (from right to left as seen in FIG. 5), whereby the tubular member 12 can be threadably and releasably secured onto a threaded male attachment fitting carried by the welding torch body (not shown). The attachment fitting in the torch defines a conical surface (not shown) adapted to receive and sealably engage the rounded end portion 38a of fitting 38 so as to create a gas-tight seal therebetween. Such fittings and coupling nuts are well known in the welding art. It is to be understood, however, that the male and female attachment surfaces defined by the fitting carried by the torch body and end fitting 38 could be reversed and a wide variety of different fittings also could be employed to releasably and sealably secure the downstream end of the electrically conductive tubular member 12 to the welding torch.

The coupling nut 40 and fitting 38 preferably are formed of brass as they comprise portions of the electrical connection between the power cable 13 and the welding torch and because brass is very easy to machine. Other suitable materials could be used and, if desired, the fitting 38 could be made of copper and integrally formed with the tubular member 12. However, copper is a softer material than brass and many welders exert a strong pressure on the welding torch during use, and thus exert considerable pressure on the juncture between fitting 38 and the mating fitting in the torch handle. By forming a separate fitting 38 of brass and brazing the fitting onto the downstream end of the tubular member 12, as opposed to integrally forming the end fitting of copper with the tubular member, the likelihood of any deformation of the rounded sealing surface on the fitting and resulting deterioration of the seal formed thereby with the fitting in the torch is reduced.

During use, the power cable 13 in assembly 11 is in electrical communication with the torch head (not shown) through the crimped connection with the electrically conductive tubular member 12. The argon or other weld-shielding gas flows through the power cable assembly 11 within the outer hose 15 about the power cable 13 therein, along the trough 18 in the crimped upstream portion 12a of the tubular member, through aperture 16 and to the torch head through the downstream portion 12b of the tubular member, fitting 38 and coupling nut 40. The gas is prevented from escaping to the atmosphere by hose 15, attachment sleeve 14 and the seal formed by the o-ring seals 24 and 26. As the welder manipulates the welding torch during use, the attachment sleeve 14 and seals 24 and 26 allows the torch to rotate back and forth with the power cable 13 with respect to the outer hose 15. While sleeve 14 is in sealing engagement with the stationary electrically conductive member 12 by means of the annular seals 24 and 26, the sealing engagement still allows for such relative rotational movement of the hose and welding torch during use, thereby substantially eliminating the resistance of the hose to rotational movement of the welding torch, resulting in improved control of the torch and a reduction in fatigue to the welder's hand.

In addition to utilizing different fittings and attachment means, various other changes and modifications can be made in carrying out the present invention without departing the spirit and scope thereof. By way of example, one or more additional annular seals could be employed between the tubular member 12 and the hose attachment sleeve 14 to better accommodate wear on the seals resulting from the relative rotation of the tubular member and the sleeve during use. In addition, the connector assembly of the present invention is useful in many applications other than TIG welding. It could be employed, for example, in MIG (metallic inert gas) welding guns, plasma welding torches, and carbon-arc cutting torches. It could also be employed in mechanized applications where the welding torch or comparable implement is moved by robotic arms or the like and a reduction in resistance to torsional movement would be desirable. Insofar as such changes and modifications are within the purview of the appended claims, they are to be considered as part of the present invention.

I claim:

1. A connector assembly for releasably securing a welding torch to an extended end portion of a power cable assembly having an outer hose disposed about and spaced from an electrically conductive cable for directing shielding gas therethrough to the torch, electrically communicating the cable with the torch and enabling the torch to be rotatably moved with respect to the hose during use to reduce torsional resistance to such movement, said connector assembly comprising:

an electrically conductive tubular member defining an upstream portion and a downstream portion and having an aperture therein between said upstream and downstream portions, said upstream portion being sized to receive therein an extended end portion of an electrically conductive cable in a power cable assembly such that upon crimping said tubular member along said upstream portion thereof so as to define a generally U-shaped trough extending along said upstream portion, said tubular member is affixed to the cable in electrical communication therewith and a gas flow path is defined, said path extending along said trough to and through said aperture and into and through the downstream portion of said tubular member;

a pair of axially spaced annular sealing members disposed about and carried by the downstream portion of said tubular member;

an electrically conductive fitting for releasably and sealably engaging an extended end portion of said downstream portion of the tubular member with a welding torch so as to electrically couple said tubular member with said torch and direct gas flow therethrough from said downstream portion of said tubular member to the torch;

a hose attachment sleeve adapted to be received within an extended end portion of an outer hose of a power cable assembly and disposed about said downstream portion of said tubular member, said sleeve being sized relative to said sealing members so as to define gas-tight seals therewith while being rotatably moveable on said seals;

at least one sleeve retention member for retaining said hose attachment sleeve on said tubular member; and an attachment member for disposition about the extended end portion of the outer hose and said attachment sleeve for securing the extended end portion of the outer hose to said attachment sleeve.

2. The connector assembly of claim 1 wherein said downstream portion of said tubular member defines a pair of spaced recesses therein and wherein said annular sealing members are disposed in said recesses whereby said sealing members are retained in place during relative movement of said hose attachment sleeve and said tubular member.

3. The connector assembly of claim 1 wherein said annular sealing members are o-rings.

4. The connector assembly of claim 2 wherein said annular sealing members are o-rings.

5. The connector assembly of claim 1 wherein said hose attachment sleeve defines a plurality of surface irregularities thereon for engaging the extended end portion of the outer hose of the power cable assembly on said attachment member being secured about the extended end portion of the outer hose and said attachment sleeve.

6. The connector assembly of claim 1 wherein said electrically conductive tubular member is of a single-piece copper construction.

7. The connector assembly of claim 1 wherein the tubular member is of two-piece construction, a first piece comprising said upstream and downstream portions and being formed of copper, and a second piece being formed of brass and secured to an extended end of said downstream end portion of said tubular member so as to be in electrical communication therewith, said second piece defining a first curvilinear sealing surface and a second planar sealing surface for forming electrical and fluid-tight communications with the welding torch and with said electrically conductive fitting.

8. The connector assembly of claim 1 wherein said attachment member comprises a metal ferrule adapted to be crimped in place.

9. The connector assembly of claim 2 wherein said hose attachment sleeve defines a plurality of surface irregularities thereon for engaging the extended end portion of the outer hose of the power cable assembly on said attachment member being secured about the extended end portion of the outer hose and said attachment sleeve.

10. The connector assembly of claim 9 wherein said annular sealing members are o-rings.

11. The connector assembly of claim 9 wherein said electrically conductive tubular member is of a single-piece copper construction.

12. The connector assembly of claim 9 wherein the tubular member is of two-piece construction, a first piece comprising said upstream and downstream portions and being formed of copper, and a second piece being formed of brass and secured to an extended end of said downstream end portion of said tubular member so as to be in electrical communication therewith, said second piece defining a first curvilinear sealing surface and a second planar sealing surface for forming electrical and fluid-tight communications with the welding torch and with said electrically conductive fitting.

13. A connector assembly for releasably securing a cutting torch to an extended end portion of a power cable having an outer hose disposed about an electrically conductive cable such that the torch can be rotatably moved with respect to the hose during use to reduce torsional resistance to such movement, said connector assembly comprising:

an electrically conductive tubular member defining an upstream portion and a downstream portion and having an aperture therein between said upstream and downstream portions, said upstream portion being sized to receive therein an extended end portion of an electrically conductive cable in a power cable assembly such that upon crimping said tubular member along said upstream portion thereof so as to define a generally U-shaped trough extending along said upstream portion, said tubular member is affixed to the cable in electrical communication therewith and a gas flow path is defined, said path extending along said trough to and through said aperture and into and through the downstream portion of said tubular member;

a pair of axially spaced annular sealing members disposed about and carried by the downstream portion of said tubular member;

an electrically conductive fitting for releasably and sealably engaging an extended end portion of said downstream portion of the tubular member with a cutting torch so as to electrically couple said tubular member with said torch and direct gas flow therethrough from said downstream portion of said tubular member to the torch;

a hose attachment sleeve adapted to be received within an extended end portion of an outer hose of a power cable assembly and disposed about said downstream portion of said tubular member, said sleeve being sized relative to said sealing members so as to define gas-tight seals therewith while being rotatably moveable on said seals;

at least one sleeve retention member for retaining said hose attachment sleeve on said tubular member; and an attachment member for disposition about the extended end portion of the outer hose and said attachment sleeve for securing the extended end portion of the outer hose to said attachment sleeve.

14. The connector assembly of claim 13 wherein said downstream portion of said tubular member defines a pair of spaced recesses therein and wherein said annular sealing members are disposed in said recesses whereby said sealing members are retained in place during relative movement of said hose attachment sleeve and said tubular member.

15. The connector assembly of claim 13 wherein said annular sealing members are o-rings.

16. The connector assembly of claim 14 wherein said annular sealing members are o-rings.

17. The connector assembly of claim 13 wherein said hose attachment sleeve defines a plurality of surface irregularities thereon for engaging the extended end portion of the outer hose of the power cable assembly on said attachment member being secured about the extended end portion of the outer hose and said attachment sleeve.

18. The connector assembly of claim 13 wherein said electrically conductive tubular member is of a single-piece copper construction.

19. The connector assembly of claim 13 wherein the tubular member is of two-piece construction, a first piece comprising said upstream and downstream portions and being formed of copper, and a second piece being formed of brass and secured to an extended end of said downstream end portion of said tubular member so as to be in electrical communication therewith, said second piece defining a first curvilinear sealing surface and a second planar sealing surface for forming electrical and fluid-tight communications with the welding torch and with said electrically conductive fitting.

20. The connector assembly of claim 17 wherein said electrically conductive tubular member is of a single-piece copper construction.

21. The connector assembly of claim 17 wherein the tubular member is of two-piece construction, a first piece comprising said upstream and downstream portions and being formed of copper, and a second piece being formed of brass and secured to an extended end of said downstream end portion of said tubular member so as to be in electrical communication therewith, said second piece defining a first curvilinear sealing surface and a second planar sealing surface for forming electrical and fluid-tight communications with the welding torch and with said electrically conductive fitting.

22. A power cable assembly for use with an air-cooled welding or cutting torch, said assembly comprising:
- an electrically conductive cable for providing power to a torch;
- an outer hose disposed about said cable for directing gas to the torch;
- an electrically conductive tubular member defining an upstream portion and a downstream portion and having an aperture therein between said upstream and downstream portions, said upstream portion being crimped about an extended end portion of said cable so as to secure said tubular member to said cable in electrical communication therewith and define a trough extending along said upstream portion of said tubular member to said aperture;
- a pair of axially spaced annular sealing members disposed about and carried by the downstream portion of said tubular member;
- an electrically conductive fitting for releasably and sealably engaging an extended end portion of said downstream portion of said tubular member with the torch;
- a hose attachment sleeve disposed within an extended end portion of said outer hose and about said downstream portion of said tubular member, said sleeve defining gas-tight seals with said sealing members and being rotatably moveable on said sealing members with respect to said cable thereby defining a gas flow path extending through said outer hose, along said trough, to and through said aperture and into and through the downstream portion of said tubular member and to the torch through said electrically conductive fitting;
- at least one sleeve retention member retaining said hose attachment sleeve on said tubular member; and
- an attachment member disposed about said extended end portion of said outer hose and said attachment sleeve, securing the extended end portion of said outer hose to said attachment sleeve.

23. The connector assembly of claim 22 wherein said downstream portion of said tubular member defines a pair of spaced recesses therein and wherein said annular sealing members are disposed in said recesses whereby said sealing members are retained in place during relative movement of said hose attachment sleeve and said tubular member.

24. The connector assembly of claim 22 wherein said annular sealing members are o-rings.

25. The connector assembly of claim 24 wherein said annular sealing members are o-rings.

26. The connector assembly of claim 22 wherein said hose attachment sleeve defines a plurality of surface irregularities thereon engaging the extended end portion of the outer hose.

27. The connector assembly of claim 22 wherein said electrically conductive tubular member is of a single-piece copper construction.

28. The connector assembly of claim 22 wherein the tubular member is of two-piece construction, a first piece comprising said upstream and downstream portions and being formed of copper, and a second piece being formed of brass and secured to an extended end of said downstream end portion of said tubular member so as to be in electrical communication therewith, said second piece defining a first curvilinear sealing surface and a second planar sealing surface for forming electrical and fluid-tight communications with the welding or cutting torch and with said electrically conductive fitting.

* * * * *